(12) United States Patent
Sharman et al.

(10) Patent No.: US 12,309,377 B2
(45) Date of Patent: May 20, 2025

(54) IMAGE DATA ENCODING AND DECODING

(71) Applicant: SONY CORPORATION, Tokyo (JP)

(72) Inventors: Karl James Sharman, Newbury (GB); Stephen Mark Keating, Berkshire (GB); Adrian Richard Browne, Southampton (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/276,411

(22) PCT Filed: Sep. 24, 2019

(86) PCT No.: PCT/GB2019/052683
§ 371 (c)(1),
(2) Date: Mar. 15, 2021

(87) PCT Pub. No.: WO2020/065293
PCT Pub. Date: Apr. 2, 2020

(65) Prior Publication Data
US 2022/0078430 A1    Mar. 10, 2022

(30) Foreign Application Priority Data
Sep. 24, 2018  (GB) ..................... 1815560

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC .. H04N 19/132; H04N 19/105; H04N 19/117; H04N 19/159; H04N 19/17; H04N 19/186
See application file for complete search history.

(56) References Cited

U.S. PATENT DOCUMENTS

2009/0257499 A1* 10/2009 Karczewicz ......... H04N 19/523
375/240.16
2011/0158324 A1* 6/2011 Yoshino ............... H04N 19/117
375/E7.188
(Continued)

FOREIGN PATENT DOCUMENTS

AU        2015230830 B2    10/2015
KR    10-2012-0005991 A    1/2012
(Continued)

OTHER PUBLICATIONS

International Search Report mailed on Jan. 27, 2020 in PCT/GB2019/052683 filed on Sep. 24, 2019 (4 pages).
(Continued)

*Primary Examiner* — Mohammed S Rahaman
(74) *Attorney, Agent, or Firm* — Oblon, McClelland, Maier & Neustadt, L.L.P.

(57) ABSTRACT

Image data encoding and/or decoding apparatus comprises an inter-image predictor configured to predict samples of a current image region, of a plurality of regions of an image in a sequence of images, with respect to a reference image region of another, reference, image of the sequence of images, according to a direction vector indicating a spatial displacement of the reference image region from the current image region; an interpolation filter configured to generate the predicted samples of the current image region by spatial interpolation of samples of the reference image region, at least in instances where the direction vector indicates a spatial displacement of a non-integer number of samples, in
(Continued)

which the interpolation filter is configured to operate according to a set of filter parameters each defining the spatial frequency response of a set of filters providing interpolation at a spatial displacement resolution of 1/m sample, where m is an integer greater than one; and a filter response selector configured to select a set of the filter parameters from two or more candidate sets of filter parameters for use in respect of at least the current image region.

10 Claims, 11 Drawing Sheets

(51) Int. Cl.
*H04N 19/117* (2014.01)
*H04N 19/159* (2014.01)
*H04N 19/17* (2014.01)
*H04N 19/186* (2014.01)

(52) U.S. Cl.
CPC ........... *H04N 19/159* (2014.11); *H04N 19/17* (2014.11); *H04N 19/186* (2014.11)

(56) References Cited

U.S. PATENT DOCUMENTS

| | | | |
|---|---|---|---|
| 2012/0114039 A1* | 5/2012 | Wang | H04N 11/02 375/E7.243 |
| 2012/0230393 A1* | 9/2012 | Naing | H04N 19/117 375/E7.125 |
| 2012/0269261 A1* | 10/2012 | Choi | H04N 19/82 375/E7.245 |
| 2013/0051463 A1 | 2/2013 | Minoo et al. | |
| 2013/0182780 A1* | 7/2013 | Alshin | H04N 19/635 375/240.29 |
| 2014/0192876 A1* | 7/2014 | Yie | H04N 19/80 375/240.12 |
| 2015/0178893 A1 | 6/2015 | Alshina et al. | |
| 2017/0070747 A1* | 3/2017 | Yang | H04N 19/117 |
| 2019/0028736 A1 | 1/2019 | Karczewicz et al. | |

FOREIGN PATENT DOCUMENTS

| | | |
|---|---|---|
| WO | WO 2009/126936 A1 | 10/2009 |
| WO | WO 2014/053512 A1 | 4/2014 |

OTHER PUBLICATIONS

Sze, V. et al., "High Efficiency Video Coding (HEVC), Algorithms and Architectures", 2014, Springer International Publishing Switzerland ISBN 978-3-319-06894-7,, total 384 pages.

International Telecommunication Union, "Series H: Audiovisual and Multimedia Systems, Infrastructure of audiovisual services—Coding of moving video, High efficiency video coding, Recommendation ITU-T H.265", Dec. 2016, Printed in Geneva, Switzerland, total 664 pages.

* cited by examiner

Luma

| | Tap 0 | Tap 1 | | ... | | | | Tap 7 |
|---|---|---|---|---|---|---|---|---|
| Pos 0 | 0 | 0 | 0 | 64 | 0 | 0 | 0 | 0 |
| +¼ | -1 | 4 | -10 | 58 | 17 | -5 | 1 | 0 |
| +½ | -1 | 4 | -11 | 40 | 40 | -11 | 4 | -1 |
| +¾ | 0 | 1 | -5 | 17 | 58 | -10 | 4 | -1 |

Chroma

| | Pos 0 | +⅛ | +¼ | ... | | | | +⅞ |
|---|---|---|---|---|---|---|---|---|
| Tap0 | 0 | -2 | -4 | -6 | -4 | -4 | -2 | -2 |
| ⋮ | 64 | 58 | 54 | 46 | 36 | 28 | 16 | 10 |
| ⋮ | 0 | 10 | 16 | 28 | 36 | 46 | 54 | 58 |
| Tap3 | 0 | -2 | -2 | -4 | -4 | -6 | -4 | -2 |

FIG. 12

Luma

| 0 | 0 | 0 | 64 | 0 | 0 | 0 | 0 |
|---|---|---|---|---|---|---|---|
| -2 | 5 | -11 | 58 | 18 | -6 | 2 | 0 |
| -2 | 6 | -13 | 41 | 41 | -13 | 6 | -2 |
| 0 | 2 | -6 | 18 | 58 | -11 | 5 | -2 |

Chroma

| 0 | -3 | -5 | -7 | -5 | -5 | -2 | -2 |
|---|---|---|---|---|---|---|---|
| 64 | 58 | 54 | 47 | 37 | 29 | 17 | 11 |
| 0 | 11 | 17 | 29 | 37 | 47 | 54 | 58 |
| 0 | -2 | -2 | -5 | -5 | -7 | -5 | -3 |

FIG. 13

Luma

| 0 | 0 | 0 | 64 | 0 | 0 | 0 | 0 |
|---|---|---|---|---|---|---|---|
| -2 | 6 | -13 | 59 | 19 | -7 | 2 | 0 |
| -2 | 7 | -15 | 42 | 42 | -15 | 7 | -2 |
| 0 | 2 | -7 | 19 | 59 | -13 | 6 | -2 |

Chroma

| 0 | -4 | -6 | -7 | -6 | -4 | -3 | -2 |
|---|---|---|---|---|---|---|---|
| 64 | 61 | 55 | 47 | 38 | 28 | 18 | 9 |
| 0 | 9 | 18 | 28 | 38 | 47 | 55 | 61 |
| 0 | -2 | -3 | -4 | -6 | -7 | -6 | -4 |

FIG. 14

Luma

| 0 | 0 | 0 | 64 | 0 | 0 | 0 | 0 |
|---|---|---|---|---|---|---|---|
| -1 | 4 | -10 | 58 | 17 | -5 | 1 | 0 |
| -1 | 5 | -12 | 40 | 40 | -12 | 5 | -1 |
| 0 | 1 | -5 | 17 | 58 | -10 | 4 | -1 |

Chroma

| 0 | -2 | -3 | -5 | -4 | -3 | -2 | -1 |
|---|---|---|---|---|---|---|---|
| 64 | 58 | 53 | 45 | 36 | 27 | 16 | 9 |
| 0 | 9 | 16 | 27 | 36 | 45 | 53 | 58 |
| 0 | -1 | -2 | -3 | -4 | -5 | -3 | -2 |

FIG. 15

IMAGE DATA ENCODING AND DECODING

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Some standards and draft standards, such as the so-called High Efficiency Video Coding (HEVC) standards or the Joint Exploration Model (JEM) or Future Video Coding (FVC) proposals, define encoding and decoding systems applicable to the present disclosure.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12 to 15 schematically illustrate sets of filter coefficients;

DESCRIPTION OF THE PREFERRED EMBODIMENTS

Figure 1:
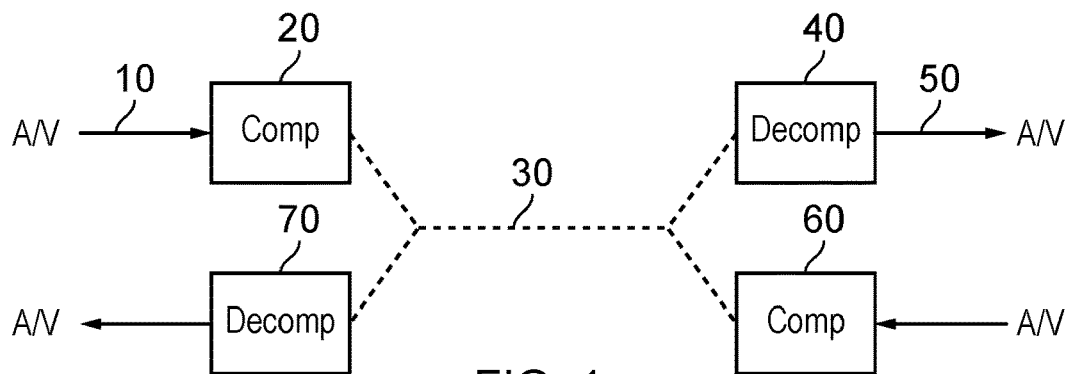
FIG. 1 schematically illustrates an audio/video (AN) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
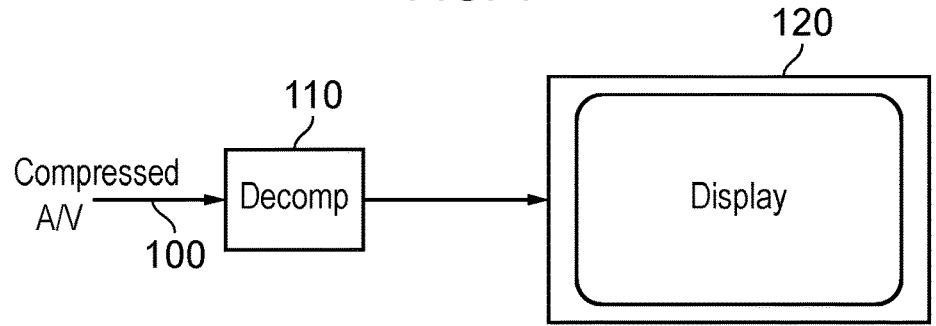
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
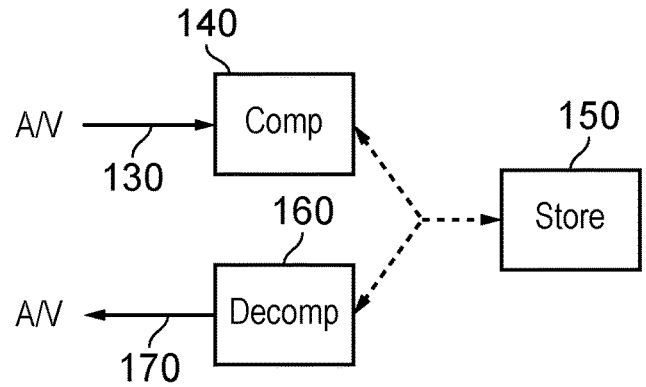
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
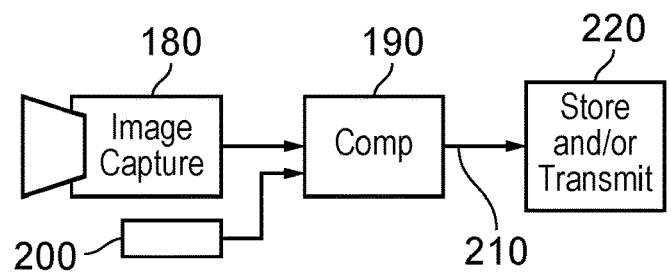
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
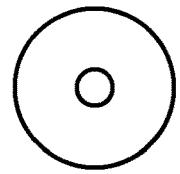
FIGS. 5 and 6 schematically illustrate storage media.
Figure 6:
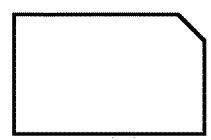

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
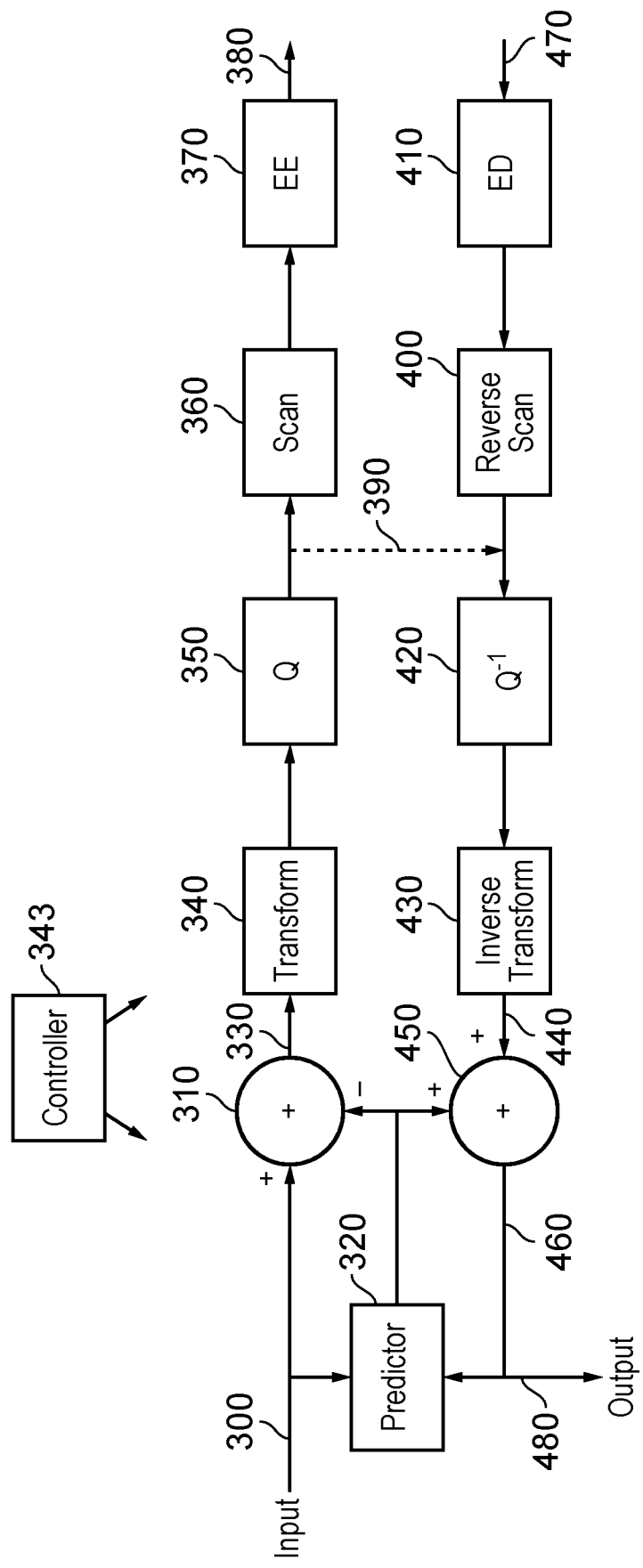
FIG. 7 provides a schematic overview of a video data compression and decompression apparatus.

FIG. 7 provides a schematic overview of a video or image data compression and decompression apparatus, for encoding and/or decoding image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7 such as those represented by the return path 410, 400, 420, 430, 450, 320. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

Therefore, in example, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress or decode a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
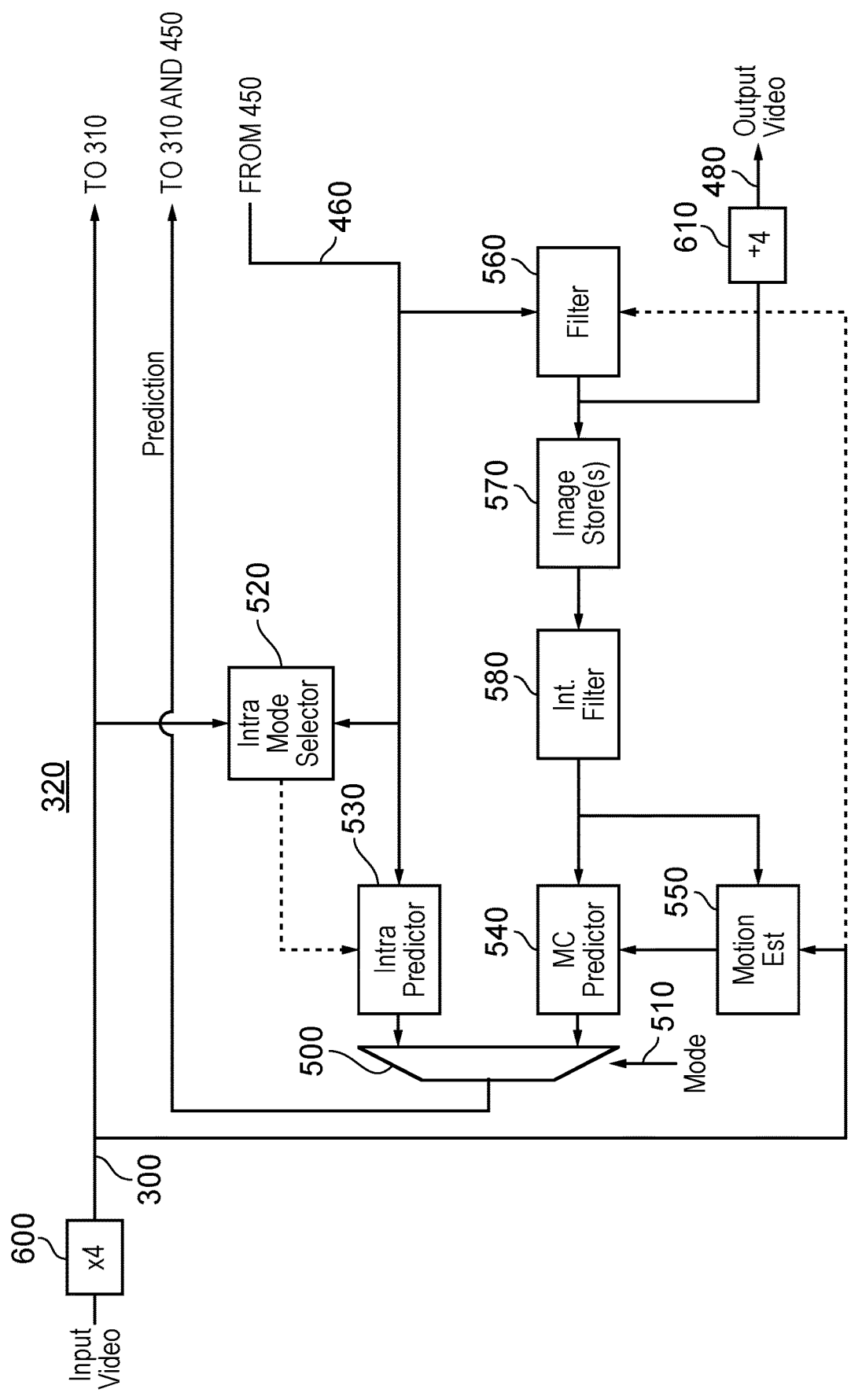
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HECV) algorithms and Architectures, Editors: Madhukar Budagavi, Gary J. Sullivan, Vivienne Sze; ISBN 978-3-319-06894-7; 2014 which is incorporated herein in its entirety by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Figure 9:
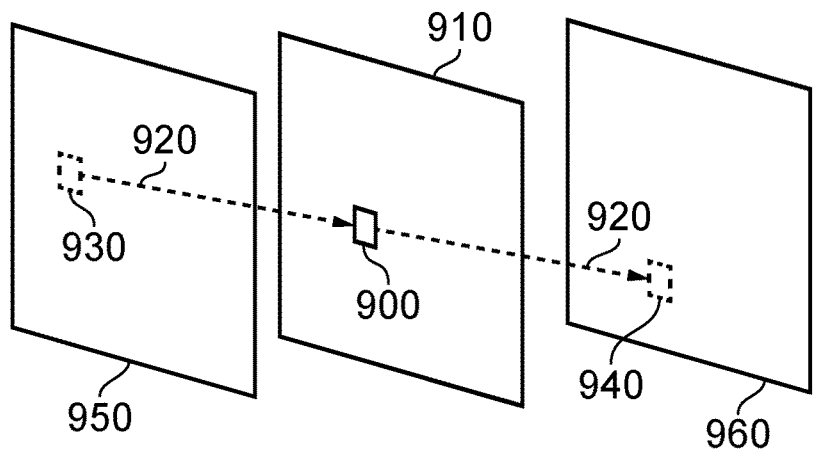
FIG. 9 schematically illustrates an inter-prediction process.

FIG. 9 schematically illustrates an inter-prediction process, in which a block or region 900 of a current image 910 is predicted with respect to a block 930, 940 or both, pointed to by a motion vector 920 in one or more other images 950, 960. In some examples, one reference image is used, whereas in other examples, two reference images are used. A choice may be made according to a fixed encoding pattern applicable to an image (as in, an image or region may be constrained so that inter prediction, when used, is based on a particular number of reference images) or according to the encoding efficiency or data quantity obtainable or predicted to be obtainable with each candidate scheme. The predicted block can be used as discussed above in the generation of residual data which is encoded as described above.

Figure 10:
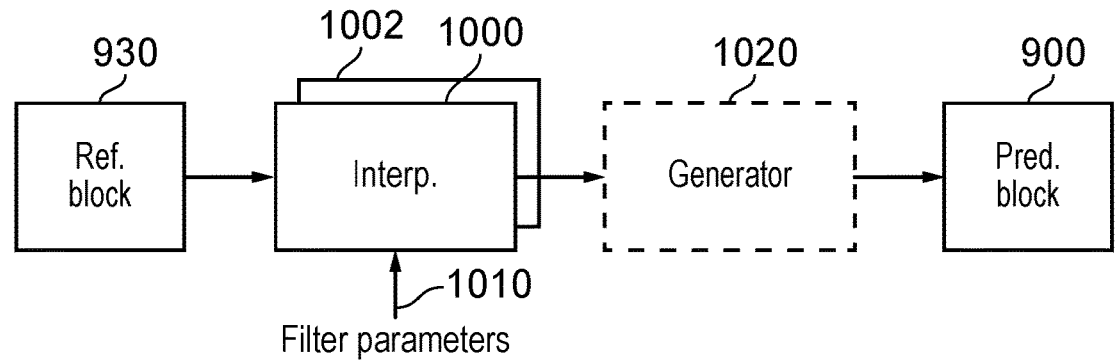
FIGS. 10 and 11 schematically illustrate inter-image interpolation apparatus.
Figure 11:
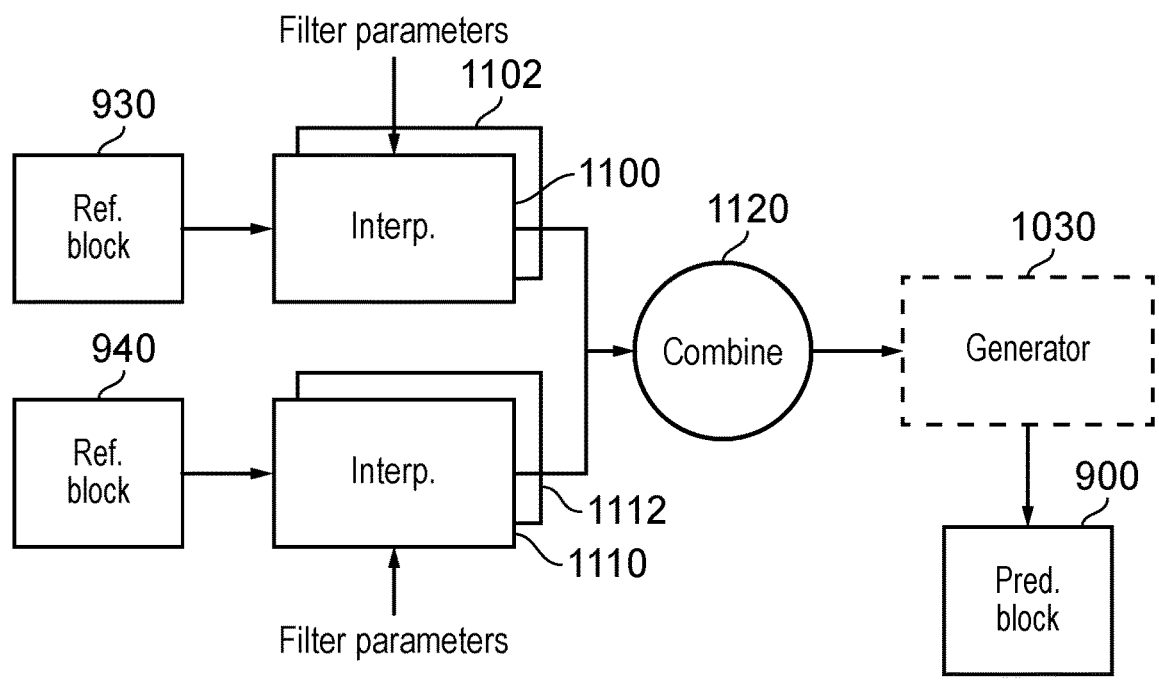

FIGS. 10 and 11 show schematically parts of the operation of the motion compensated predictor 540 of FIG. 8. In particular, FIG. 10 schematically illustrates operations in the case that one reference image is used and FIG. 11 schematically illustrates operations that two reference images are used.

Referring to FIG. 10, the reference block 930 is identified by the motion vector 920 with respects to the block 900 to be predicted. An interpolation filter 1000 interpolates samples at the position of the block 900, taking into account any fractional 1/m position information indicated by the motion vector 920 and using filter parameters 1010 defined by a filter response selector to be discussed below. The interpolated output is optionally passed to further circuitry (such as a post-filter or the like) to generate the predicted block 900, but if the interpolated output is used directly, the generator 1020 is not required (hence, it is shown in broken line in FIG. 10).

In FIG. 11, reference blocks 930, 940 are provided to respective interpolation filters 1100, 1110, each controlled by filter parameters provided by the filter response selector. It is anticipated that the filter parameters would be the same for each interpolation filter, 1100, 1110, but this is not a requirement of the system. Note that corresponding luminance and chrominance interpolation filters (using different respective coefficients) may be provided, as indicated by the luminance and chrominance filter pairs schematically shown as (1000, 1002), (1100, 1102), (1110, 1112). Therefore, example arrangements provide a luminance filter configured to generate predicted luminance samples and a chrominance filter configured to generate predicted chrominance samples, the filter response selector being configured to select a set of the filter parameters for each of the luminance filter and the chrominance filter from two or more respective candidate sets of filter parameters.

The interpolated outputs are combined by a combiner 1120 and optionally processed by a generator 1130 to arrive at the predicted block 900.

As mentioned, the interpolation filters are provided to allow for fractional sample motion vectors to be used. For example, the luminance samples can be defined to a resolution of a ¼ of a sample position, which in chrominance in a 4:2:0 mode is equivalent to ⅛ of a sample position. In general, the fractional motion vectors allow a resolution of 1/m of a sample position where m is an integer greater than 1. In examples, m is different for luminance samples (e.g. 4) and chrominance samples (e.g. 8).

Typically, in HEVEC, JEM and other standards and proposals, there is a single set of filters for the luminance channel and a single set of filters for the chrominance channel. That is to say, for luminance a set of filters allows fractional pixel motion 0, ¼, ½, ¾. For chrominance, the set of filters allows fractional pixel motion for 0, ⅛, 2/8 . . . ⅞. Note that the number of taps and the accuracy of the coefficients in the filters need not be as between luminance and chrominance. In fact, in some examples, the luminance filters are 8 tap filters and the chrominance are 4 tap filters.

In examples of the present disclosure, multiple filter sets are available. These could provide, for example, different filter responses so that in some examples in "default" filter set could have particular special frequency result; a "softer" filter set could have a softer frequency response in which the passing of higher spatial frequencies is diminished and a "sharper" filter set could have a sharper filter response in which the passing of higher frequency components is enhanced.

By adaptively selecting a filter response for use in inter-image prediction, there is the potential for more efficient encoding which would lead to a reduction in bit rate for equivalent image quality. Against this, the requirements (if any) to signal the filter set to be used have to be taken into account and also there is the potential for a minor and insignificant potential increase in complexity (for example, an additional multiplexing operation) in the encoding and decoding apparatus.

In general terms, the filter set to be used could be signalled between the encoder and the decoder or could be derived by equivalent parameters and algorithms at the encoder and at the decoder. Options for signalling information from the encoder to the decoder will be discussed further below.

FIGS. 12 to 15 provide schematic examples of different sets of filter coefficients. In each case, the luminance filter coefficients are presented in the diagram as four rows, each corresponding to successive changes in fractional position of 0, ¼, ½, ¾ and 8 tap positions tap 0 . . . tap 7 expressed as columns. For the chrominance representation, 8 taps run from tap 0 to tap 3 by row and the positions run from 0 to +⅞ by column. This notation is maintained throughout FIGS. 12 to 15.

FIG. 12 schematically illustrates a default filter set, FIG. 13 schematically illustrates a sharper filter set, FIG. 14 schematically illustrates an even sharper filter set and FIG. 15 schematically illustrates a softer filter set. As mentioned above, the references to "sharp" and "soft" refer to a degree of enhancement or de-emphasis of higher frequency components in the filtered output. Therefore, in these examples, the candidate sets of filter parameters comprise at least a default set of filter parameters defining a default spatial frequency response; a sharper set of filter parameters defining a spatial frequency response passing a greater proportion of higher spatial frequencies than the default spatial frequency response; and a softer set of filter parameters defining a spatial frequency response passing a lesser proportion of higher spatial frequencies than the default spatial frequency response Possibilities for signalling a filter section between the encoder and decoder will now be described. The signalling can take place in various ways and at various levels in the encoded data stream, for example at sequence level (such as in a sequence parameter set or SPS); at picture level (for example in a picture parameter set of PPS); at slice level (for example in a slice header); at a coding tree unit or CTU level (for example in information defining the top level CTU); at a coding unit or CU level, for example for all leaf CUs down to a particular size or level such that if there are subsequent CU divisions in the CU tree structure, they take the value of the filter definition applicable to the CU at the selected size or level limit; in all leaf CUs; and/or in prediction units (PUs).

It is noted that signalling the filter set to be used need not be performed where it is irrelevant, for example for any blocks, slices, pictures or the like are intra-image encoded or for blocks where the motion vector is an integer (assuming that the filter set representing 0 fractional motion is consistent as between all of the sets).

Figure 16:
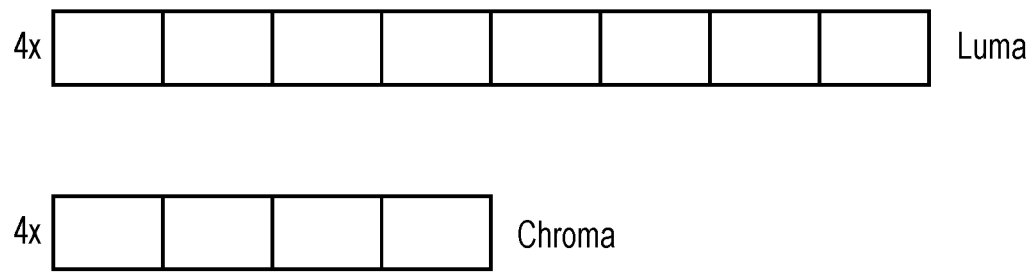
FIGS. 16 to 18 schematically illustrate example data sent from an encoder to an decoder.

An option, as illustrated schematically in FIG. 16, is to transmit, from the encoder to the decoder in the encoded data stream, a set of filter coefficients, namely 4 sets of 8 coefficients for luminance and 4 set of coefficients for chrominance. If this were done at an individual CU level it would place a potentially very significant overhead on the data rate of the encoded image data. However, if it were done at a significantly higher level such as at a picture or sequence level, it need not impose such a significant overhead. So, data similar to that show in FIG. 16 may be transmitted for a sequence and the corresponding filters used for the whole of that sequence until a next set of filter coefficients was transmitted. Therefore, in examples, the filter response selector is configured to select a set of the filter parameters for use in respect of a group of at least two image regions, for example for use in respect of a group one of more images.

Figure 17:
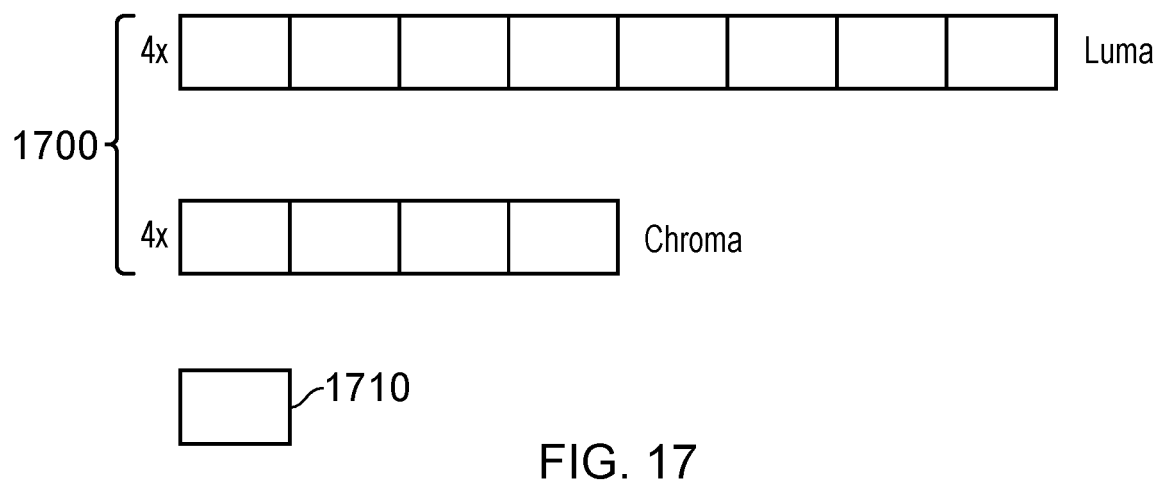

Referring to FIG. 17, assuming that the decoder is pre-configured with a default filter set, a variation filter set 1700 could be transmitted, for example once per picture or once per sequence and then a flag 1710 used to indicate whether the decoder should use the default filter set or the variation filter set for a particular CU or slice or the like.

Figure 18:
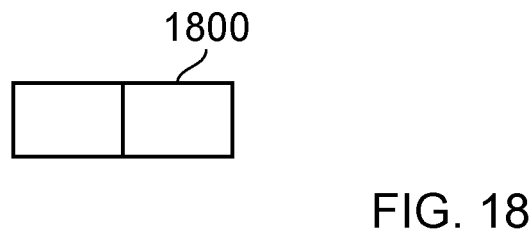

Referring to FIG. 18, if for example 4 filter sets have been pre-configured or transmitted to the decoder, a two bit flag 1800 could be used to signal which of those four should be used in a particular instance. In some examples, only a single selection needs to be sent, rather than separate luminance and chrominance selections, for example where each set of filter parameters to define a chrominance interpolation filter is mapped to a respective set of filter parameters to define a luminance interpolation filter, so that selection, by the filter response selector, of a set of filter parameters to define the luminance interpolation filter implies a selection of the mapped set of filter parameters to define the chrominance interpolation filter.

Figure 19:
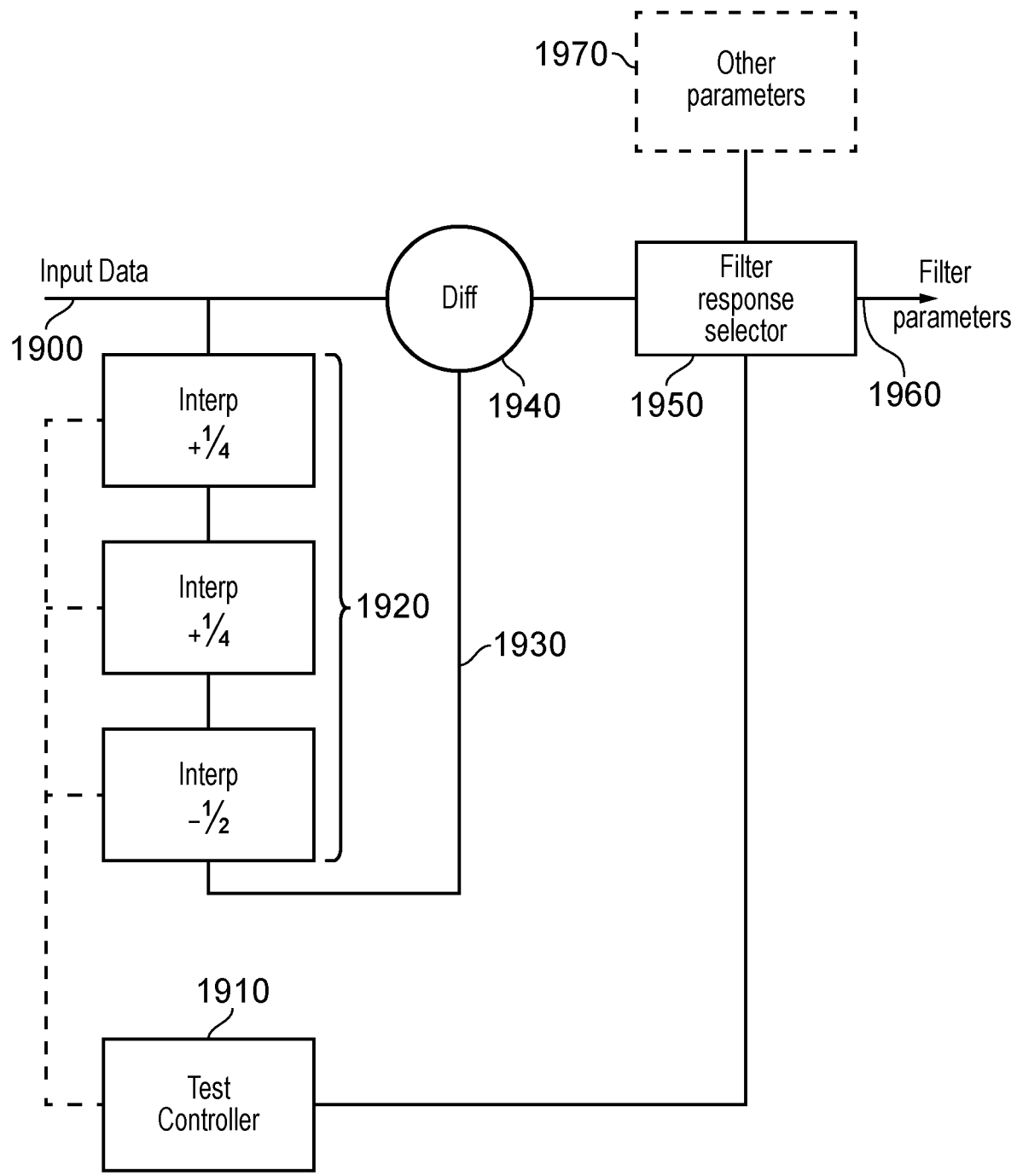
FIG. 19 schematically illustrates a filter selection process at an encoder.

FIG. 19 schematically illustrates an arrangement at the encoder to select a filter set to be used, in which the encoder makes this assessment by applying a series of interpolation operations, each being a fractional sample interpolation using a candidate set of filter parameters and having a net spatial shift of zero. An example of such series is shown in FIG. 19 in which, for at least a subset of the input data 1900, three interpolations are carried out under the control of a test controller 1910 (for example forming part of the controller 343). The series 1920 comprises two successive interpolation imposing a fractional shift of +¼ followed by an interpolation imposing a fractional shift of –½ resulting in data 1930 notionally having a zero spatial displacement with reference to the corresponding input data 1900. Any artefacts introduced by the series of filtering operations represented by the series 1920 will give rise to differences between the input data 1930, which are detected by a difference detector 1940 (for example, a subtractor).

Under the control of the test controller 1910, this test is performed for each candidate filter set under consideration and the filter response selector 1950 selects a set of filter parameters 1960 based on the difference data output by the detector 1940, for example choosing a set of filter parameters giving the lowest difference.

This provides an example in which the filter response selector is configured to compare a group of samples with test samples generated by a test series of two or more fractional sample interpolations using different candidate sets of filter parameters and having a net spatial shift of zero. The filter response selector may be configured to select a candidate set of filter parameters according to a detected difference between the group of samples and the test samples.

The filter response selector may take other parameters 1970 into account, for example parameters discussed below.

FIGS. 20 to 23 schematically represent options for the derivation and/or transmission of data defining the filter parameters to use.

Figure 20:
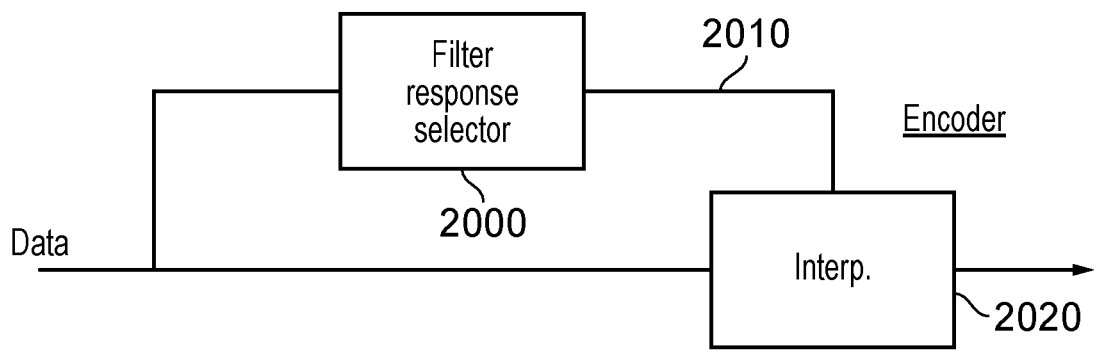
FIGS. 20 and 22 schematically illustrate parts of encoders.
Figure 21:
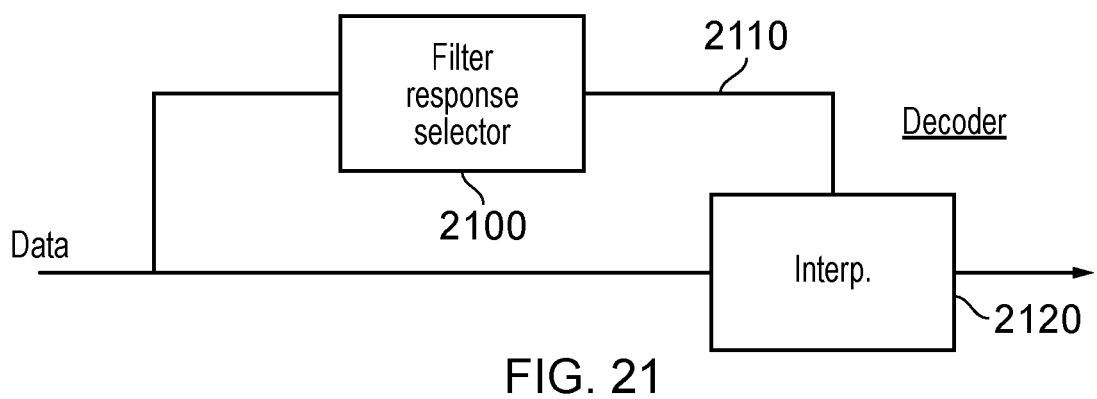
FIGS. 21 and 23 schematically illustrate parts of decoders.

In FIG. 20, an encoder derives the filter selection by the filter response 2000 based on one or more attributes of the data stream, for example making use of one or more attributes of the reconstructed data (such that it would be available at the decoder) and/or compression parameters such as the quantisation parameter or others, in order to derive a selection 2010 to control the operation of an interpolator 2020. At the decoder in FIG. 21, exactly the same operation is carried out by a filter response selector 2100 to derive a selection 2110 to control an equivalent interpolator 2120. As mentioned, in both cases, the same source data (reconstructed image data and/or other parameters of the compression which are available to the encoder and the decoder) is used by the filter response selectors.

This provides an example in which the filter response selector (at the encoder and the decoder, or alternatively only at the encoder) is configured to select a set of filter parameters in dependence upon another encoding parameter.

A list of suitable parameters on which the decision of filter selection can be based at both the encoder and the decoder (or alternatively at the encoder, if filter selection data is also transmitted) includes one or more parameters selected from the list consisting of: a quantisation parameter; an image size; an image region size; a position of the current image region in a hierarchy of image regions; a spatial frequency transform used by the image encoding apparatus; a magnitude of the direction vector; a selection of a set of filter parameters in respect of the prediction of an image region neighbouring the current image region and a selection of a set of filter parameters in respect of the prediction of the reference image region.

Figure 22:
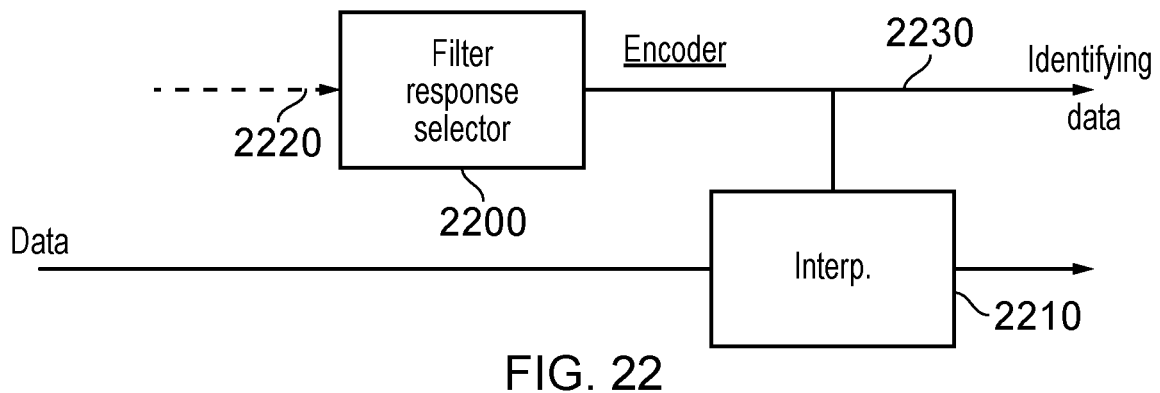

In FIG. 22, the filter response selector 2200 derives a filter response to control the interpolator 2210 based on any suitable input 2220 such as trial data as discussed above, data defining the filter selection at a higher level in a block or image hierarchy or the like. The filter response selector generates identifying data 2230 for transmission to the decoder, for example as part of or otherwise in association with an encoded data stream. This provides an example in which the filter response selector of an encoder is configured to generate indicator data for provision to an image data decoding apparatus, the indicator data indicating a selection, by the filter response selector, of a set of filter parameters. As discussed, the encoder may be configured to provide the indicator data as part of at least one of: a sequence parameter set; a picture parameter set; a slice header; and a coding unit header.

In some examples, the filter response selector of the encoder is configured to generate filter definition data for provision to an image data decoding apparatus, the filter definition data representing a set of filter parameters selected by the filter response selector. For example, where the interpolation filter comprises an n-tap filter, the filter definition data may comprise a set (or plural sets) of n filter coefficients.

Figure 23:
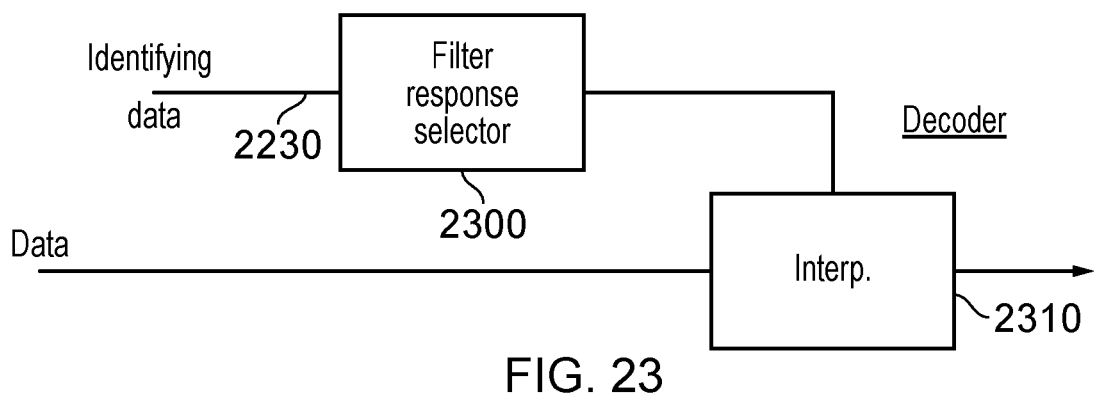

In FIG. 23, at the decoder, the identifying data 2230 controls the operation of a filter response selector 2300 which in turn controls the interpolator 2310. This provides an example in which the filter response selector of a decoder is configured to be responsive to indicator data associated with encoded image data for decoding, the indicator data indicating a selection, by the filter response selector, of a set of filter parameters. As mentioned above, the decoder may be configured to receive the indicator data as part of at least one of: a sequence parameter set; a picture parameter set; a slice header; and a coding unit header. In some examples, the filter response selector of the decoder is configured to be responsive to filter definition data associated with encoded image data for decoding, the filter definition data representing a set of filter parameters selected by the filter response selector. In an example situation (compare with FIGS. 16 and 17) in which the interpolation filter comprises an n-tap filter, the filter definition data may comprise a set (or more than one set) of n filter coefficients.

For example, the interpolation filter for luminance samples may comprise an 8-tap filter; and the interpolation filter for chrominance samples comprises a 4-tap filter.

FIG. 10 schematically illustrates a set of temporal layers in a group of pictures, forming a hierarchy of temporal layers which extends, as drawn, from a highest temporal layer to a lowest temporal layer. In some examples, pictures in a lower temporal layer derive in an inter-image interpolation from pictures in the next-higher temporal layer.

Figure 24:
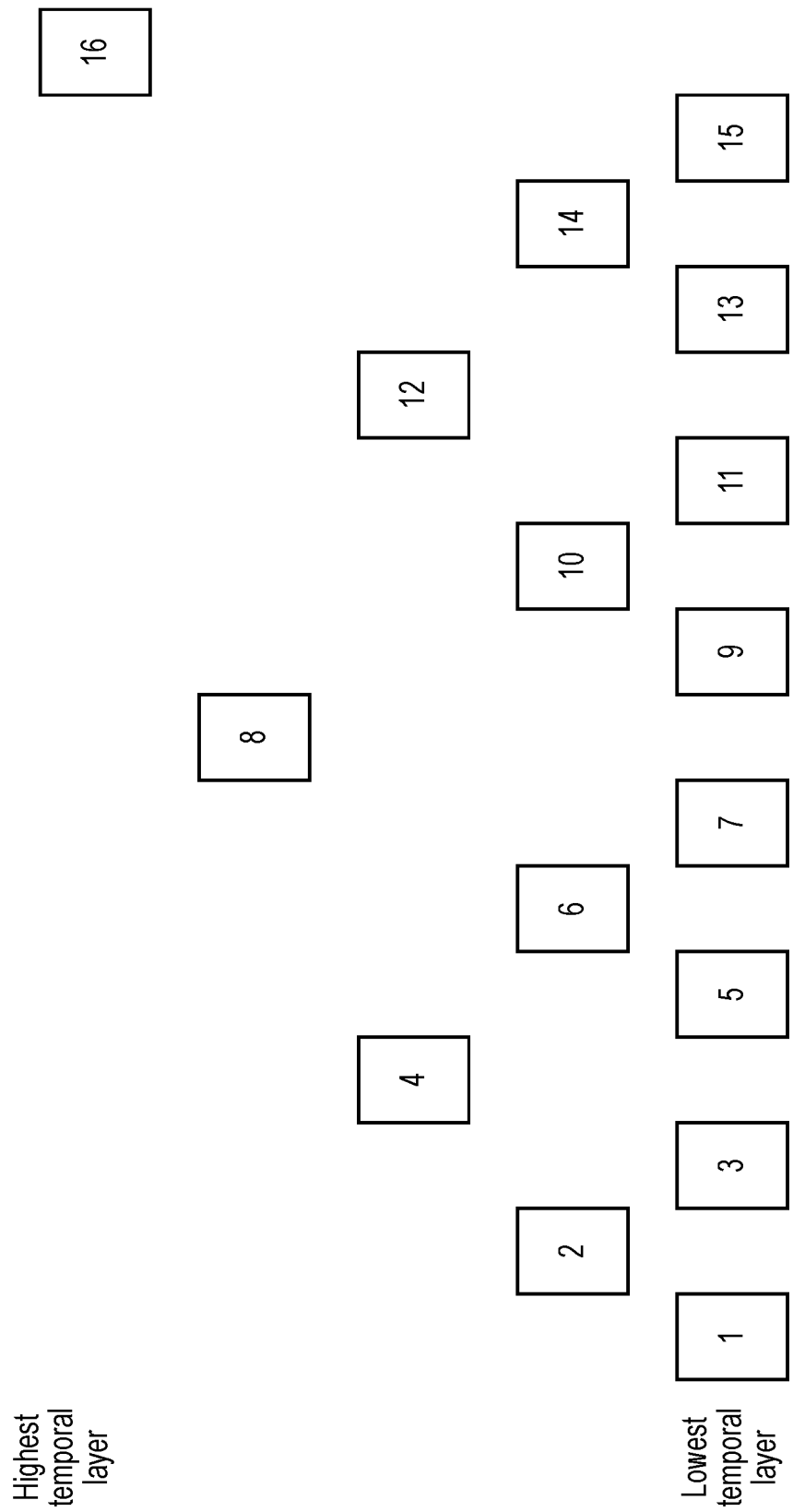
FIG. 24 schematically illustrates a hierarchy of temporal layers.

In examples of the present disclosure, a filter selection is made and communicated between the encoder and the decoder for temporal layers of at least a threshold level in the hierarchy of FIG. 24, for example the uppermost 2 temporal layers, and the same selection is used for any images in a temporal layer below that threshold level.

This therefore provides an example in which the sequence of images are configured as a hierarchy of temporal layers, and in which the filter response selector is configured to select a set of the filter parameters in respect of one or more higher layers of the hierarchy of temporal layers, the interpolation filter being configured to use the selected set of the filter parameters in respect of all temporal layers below the one or more higher temporal layers.

Figure 25:
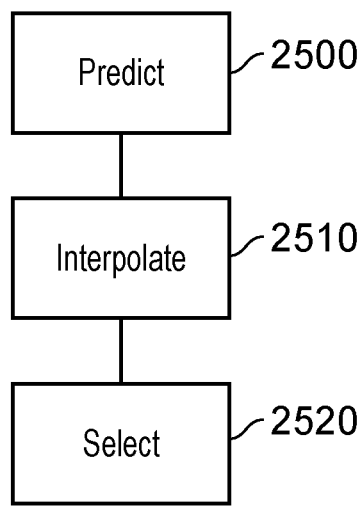
FIGS. 25 and 26 are schematic flowcharts illustrating respective methods.

FIG. 25 is a schematic flowchart illustrating an image data encoding method comprising:

predicting (at a step 2500) samples of a current image region, of a plurality of regions of an image in a sequence of images, with respect to a reference image region of a reference image of the sequence of images, according to a direction vector indicating a spatial displacement of the reference image region from the current image region;

interpolating (at a step 2510) the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and selecting (at a step 2520) a set of the filter parameters from two or more candidate sets of filter parameters for use in respect of at least the current image region.

The apparatus of FIG. 7, making use of the predictor of FIG. 10 or 11, provides an example of image data encoding apparatus (or decoding apparatus, where the corresponding actions are performed at the decode) comprising:

an inter-image predictor 320, 930, 1000 configured to predict samples of a current image region, of a plurality of regions of an image in a sequence of images, with respect to a reference image region of a reference image of the sequence of images (or indeed a respective reference region of two or more reference images), according to a direction vector indicating a spatial displacement of the reference image region from the current image region, the inter-image predictor comprising an interpolation filter 1000, 1100, 1110 configured to generate the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and a filter response selector 1950, 2000, 2100, 2200, 2300 configured to select a set of the filter parameters from two or more candidate sets of filter parameters for use in respect of at least the current image region.

Figure 26:
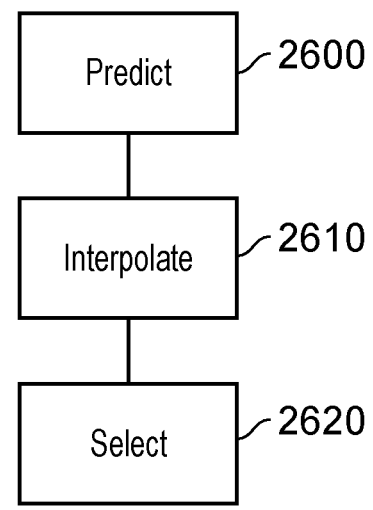

FIG. 26 is a schematic flowchart illustrating an image data decoding method comprising:

predicting (at a step 2600) samples of a current image region, of a plurality of regions of an image in a sequence of images, with respect to a reference image region of a reference image of the sequence of images, according to a direction vector indicating a spatial displacement of the reference image region from the current image region;

interpolating (at a step 2610) the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and selecting (at a step 2620) a set of the filter parameters from two or more candidate sets of filter parameters for use in respect of at least the current image region.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. Image data encoding apparatus comprising:
    an inter-image predictor configured to predict samples of a current image region, of a plurality of regions of an image in a sequence of images, with respect to a reference image region of a reference image of the sequence of images, according to a direction vector indicating a spatial displacement of the reference image region from the current image region; the inter-image predictor comprising an interpolation filter configured to generate the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and
    a filter response selector configured to select a set of the filter parameters from two or more candidate sets of filter parameters for use in respect of at least the current image region.

2. Apparatus according to clause 1, in which the filter response selector is configured to select a set of filter parameters in dependence upon another encoding parameter.

3. Apparatus according to clause 1 or clause 2, in which the filter response selector is configured to generate indicator data for provision to an image data decoding apparatus, the indicator data indicating a selection, by the filter response selector, of a set of filter parameters.

4. Apparatus according to clause 3, in which the apparatus is configured to provide the indicator data as part of at least one of: a sequence parameter set; a picture parameter set; a slice header; and a coding unit header.

5. Apparatus according to clause 4, in which the filter response selector is configured to select a set of filter parameters in dependence upon another encoding parameter.

6 Apparatus according to clause 5, in which the other encoding parameter is a parameter selected from the list consisting of: a quantisation parameter; an image size; an image region size; a position of the current image region in a hierarchy of image regions; a spatial frequency transform used by the image encoding apparatus; a magnitude of the direction vector; a selection of a set of filter parameters in respect of the prediction of an image region neighbouring the current image region and a selection of a set of filter parameters in respect of the prediction of the reference image region.

7. Apparatus according to any one of the preceding clauses, comprising a luminance filter configured to generate predicted luminance samples and a chrominance filter configured to generate predicted chrominance samples, the filter response selector being configured to select a set of the filter parameters for each of the luminance filter and the chrominance filter from two or more respective candidate sets of filter parameters.

8. Apparatus according to clause 7, in which m is different for luminance samples and chrominance samples.

9. Apparatus according to clause 8, in which m is equal to 4 for luminance samples and m is equal to 8 for chrominance samples.

10. Apparatus according to clause 7, in which each set of filter parameters to define a chrominance interpolation filter is mapped to a respective set of filter parameters to define a luminance interpolation filter, so that selection, by the filter response selector, of a set of filter parameters to define the luminance interpolation filter implies a selection of the mapped set of filter parameters to define the chrominance interpolation filter.

11. Apparatus according to any one of the preceding clauses, in which the filter response selector is configured to select a set of the filter parameters for use in respect of a group of at least two image regions.

12. Apparatus according to clause 11, in which the filter response selector is configured to select a set of the filter parameters for use in respect of a group one of more images.

13. Apparatus according to clause 12, in which the sequence of images are configured as a hierarchy of temporal layers, and in which the filter response selector is configured to select a set of the filter parameters in respect of one or more higher layers of the hierarchy of temporal layers, the interpolation filter being configured to use the selected set of the filter parameters in respect of all temporal layers below the one or more higher temporal layers.

14. Apparatus according to any one of the preceding clauses, in which the filter response selector is configured to generate filter definition data for provision to an image data decoding apparatus, the filter definition data representing a set of filter parameters selected by the filter response selector.

15. Apparatus according to clause 14, in which:
   the interpolation filter comprises an n-tap filter; and
   the filter definition data comprises a set of n filter coefficients.

16. Apparatus according to clause 9, in which:
   the interpolation filter for luminance samples comprises an 8-tap filter; and
   the interpolation filter for chrominance samples comprises a 4-tap filter.

17. Apparatus according to any one of the preceding clauses, in which the filter response selector is configured to compare a group of samples with test samples generated by two or more test series of fractional sample interpolations using different candidate sets of filter parameters and having a net spatial shift of zero.

18. Apparatus according to clause 17, in which the filter response selector is configured to select a candidate set of filter parameters according to a detected difference between the group of samples and the test samples.

19. Apparatus according to any one of the preceding clauses, in which the candidate sets of filter parameters comprise at least:
   a default set of filter parameters defining a default spatial frequency response;
   a sharper set of filter parameters defining a spatial frequency response passing a greater proportion of higher spatial frequencies than the default spatial frequency response; and
   a softer set of filter parameters defining a spatial frequency response passing a lesser proportion of higher spatial frequencies than the default spatial frequency response.

20. Image data decoding apparatus comprising:
   an inter-image predictor configured to predict samples of a current image region, of a plurality of regions of an image in a sequence of images, with respect to a reference image region of a reference image of the sequence of images, according to a direction vector indicating a spatial displacement of the reference image region from the current image region; the inter-image predictor comprising an interpolation filter configured to generate the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and
   a filter response selector configured to select a set of the filter parameters from two or more candidate sets of filter parameters for use in respect of at least the current image region.

21. Apparatus according to clause 20, in which the filter response selector is configured to select a set of filter parameters in dependence upon another encoding parameter.

22. Apparatus according to clause 20 or clause 21, in which the filter response selector is configured to be responsive to indicator data associated with encoded image data for decoding, the indicator data indicating a selection, by the filter response selector, of a set of filter parameters.

23. Apparatus according to clause 22, in the apparatus is configured to receive the indicator data as part of at least one of: a sequence parameter set; a picture parameter set; a slice header; and a coding unit header.

24. Apparatus according to clause 23, in which the filter response selector is configured to select a set of filter parameters in dependence upon another encoding parameter.

25. Apparatus according to clause 24, in which the other encoding parameter is a parameter selected from the list consisting of: a quantisation parameter; an image size; an image region size; a position of the current image region in a hierarchy of image regions; a spatial frequency transform used by the image encoding apparatus; a magnitude of the direction vector; a selection of a set of filter parameters in respect of the prediction of an image region neighbouring the current image region and a selection of a set of filter parameters in respect of the prediction of the reference image region.

26. Apparatus according to any one of clauses 20 to 25, comprising a luminance filter configured to generate predicted luminance samples and a chrominance filter configured to generate predicted chrominance samples, the filter response selector being configured to select a set of the filter parameters for each of the luminance filter and the chrominance filter from two or more respective candidate sets of filter parameters.

27. Apparatus according to clause 26, in which m is different for luminance samples and chrominance samples.

28. Apparatus according to clause 27, in which m is equal to 4 for luminance samples and m is equal to 8 for chrominance samples.

29. Apparatus according to clause 26, in which each set of filter parameters to define a chrominance interpolation filter is mapped to a respective set of filter parameters to define a luminance interpolation filter, so that selection, by the filter response selector, of a set of filter parameters to define the luminance interpolation filter implies a selection of the mapped set of filter parameters to define the chrominance interpolation filter.

30. Apparatus according to any one of clauses 20 to 29, in which the filter response selector is configured to select a set of the filter parameters for use in respect of a group of at least two image regions.

31. Apparatus according to clause 30, in which the filter response selector is configured to select a set of the filter parameters for use in respect of a group one of more images.

32. Apparatus according to clause 31, in which the sequence of images are configured as a hierarchy of temporal layers, and in which the filter response selector is configured to select a set of the filter parameters in respect of one or more higher layers of the hierarchy of temporal layers, the interpolation filter being configured to use the selected set of the filter parameters in respect of all temporal layers below the one or more higher temporal layers.

33. Apparatus according to any one of clauses 20 to 32, in which the filter response selector is configured to be responsive to filter definition data associated with encoded image data for decoding, the filter definition data representing a set of filter parameters selected by the filter response selector.

34. Apparatus according to clause 33, in which:
the interpolation filter comprises an n-tap filter; and
the filter definition data comprises a set of n filter coefficients.

35. Apparatus according to clause 28, in which:
the interpolation filter for luminance samples comprises an 8-tap filter; and
the interpolation filter for chrominance samples comprises a 4-tap filter.

36. Apparatus according to any one of clauses 20 to 35, in which the filter response selector is configured to compare a group of samples with test samples generated by two or more test series of fractional sample interpolations using different candidate sets of filter parameters and having a net spatial shift of zero.

37. Apparatus according to clause 36, in which the filter response selector is configured to select a candidate set of filter parameters according to a detected difference between the group of samples and the test samples.

38. Apparatus according to any one of clauses 20 to 37, in which the candidate sets of filter parameters comprise at least:
a default set of filter parameters defining a default spatial frequency response;
a sharper set of filter parameters defining a spatial frequency response passing a greater proportion of higher spatial frequencies than the default spatial frequency response; and
a softer set of filter parameters defining a spatial frequency response passing a lesser proportion of higher spatial frequencies than the default spatial frequency response.

39. Video storage, capture, transmission or reception apparatus comprising apparatus according to any one of clauses 1 to 19.

40. Video storage, capture, transmission or reception apparatus comprising apparatus according to any one of clauses 20 to 38.

41. An image data encoding method comprising:
predicting samples of a current image region, of a plurality of regions of an image in a sequence of images, with respect to a reference image region of a reference image of the sequence of images, according to a direction vector indicating a spatial displacement of the reference image region from the current image region;
interpolating the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and
selecting a set of the filter parameters from two or more candidate sets of filter parameters for use in respect of at least the current image region.

42. Computer software which, when executed by a computer, causes the computer to carry out a method according to clause 41.

43. A machine-readable non-transitory storage medium which stores software according to clause 42.

44. A data signal comprising coded data generated according to the method of clause 41.

45. An image data decoding method comprising:
predicting samples of a current image region, of a plurality of regions of an image in a sequence of images, with respect to a reference image region of a reference image of the sequence of images, according to a direction vector indicating a spatial displacement of the reference image region from the current image region;
interpolating the predicted samples of the current image region by spatial interpolation of samples of the reference image region, at least in instances where the direction vector indicates a spatial displacement of a non-integer number of samples, in which the interpolation filter is configured to operate according to a set of filter parameters each defining the spatial frequency response of a set of filters providing interpolation at a spatial displacement resolution of 1/m sample, where m is an integer greater than one; and
selecting a set of the filter parameters from two or more candidate sets of filter parameters for use in respect of at least the current image region.

46. Computer software which, when executed by a computer, causes the computer to carry out a method according to clause 45.

47. A machine-readable non-transitory storage medium which stores software according to clause 46.

The invention claimed is:
1. An image data encoding apparatus, comprising:
circuitry configured to:
predict samples of a current image region, of a plurality of regions of an image in a sequence of images, with respect to a reference image region of a reference image of the sequence of images, according to a direction vector indicating a spatial displacement of the reference image region from the current image region;
interpolate, via an interpolation filter, the predicted samples of the current image region by spatial interpolation of samples of the reference image region, at least in instances where the direction vector indicates a spatial displacement of a non-integer number of samples, in which the interpolation filter is configured to operate according to a set of filter parameters, each defining a spatial frequency response, of a set of filters providing interpolation at a spatial displacement resolution of 1/m sample, where m is an integer greater than one;
select the set of the filter parameters from two or more candidate sets of filter parameters for use in respect of at least the current image region based on only a single particular encoding parameter, wherein the single particular encoding parameter is one of a quantization parameter: an image size; an image region size: a position of the current image region in a hierarchy of image regions; a spatial frequency transform used by the image data encoding apparatus; and a magnitude of the direction vector;

encode image data generated based upon the interpolated predicted samples; and transmit an encoded data stream to an image decoding apparatus, the encoded data stream including the encoded image data in addition to a signaling of the single particular encoding parameter based on which the set of the filter parameters are selected, the encoded data stream not including a parameter specific to the selection of the selected set of the filter parameters for use in respect of at least the current image region.

2. The apparatus according to claim 1, wherein the circuitry is further configured to:

generate, via a luminance filter, predicted luminance samples;

generate, via a chrominance filter, predicted chrominance samples, and select a set of the filter parameters for each of the luminance filter and the chrominance filter from two or more respective candidate sets of filter parameters.

3. An image data decoding apparatus, comprising:
circuitry configured to:

receive encoded image data in an encoded data stream;

decode the encoded image data to obtain image data;

predict samples of a current image region, of a plurality of regions of an image in a sequence of images of the image data, with respect to a reference image region of a reference image of the sequence of images, according to a direction vector indicating a spatial displacement of the reference image region from the current image region;

interpolate, via an interpolation filter, the predicted samples of the current image region by spatial interpolation of samples of the reference image region, at least in instances where the direction vector indicates a spatial displacement of a non-integer number of samples, in which the interpolation filter is configured to operate according to a set of filter parameters, each defining a spatial frequency response, of a set of filters providing interpolation at a spatial displacement resolution of 1/m sample, where m is an integer greater than one; and select the set of the filter parameters from two or more candidate sets of filter parameters for use in respect of at least the current image region based on only a single particular encoding parameter other than a parameter specific to the set of the filter parameters for use in respect of the at least the current image region, wherein the single particular encoding parameter is one of a quantization parameter: an image size: an image region size: a position of the current image region in a hierarchy of image regions; a spatial frequency transform used by the image data decoding apparatus; and a magnitude of the direction vector, wherein the encoded data stream includes the encoded image data in addition to a signaling of the single particular encoding parameter based on which the set of the filter parameters are selected, and the encoded data stream does not include the parameter specific to the selection of the selected set of the filter parameters for use in respect of the at least the current image region.

4. A video storage, capture, transmission, or reception apparatus comprising the image data encoding apparatus according to claim 1.

5. A video storage, capture, transmission, or reception apparatus comprising the image data decoding apparatus according to claim 3.

6. An image data encoding method, comprising:

predicting samples of a current image region, of a plurality of regions of an image in a sequence of images, with respect to a reference image region of a reference image of the sequence of images, according to a direction vector indicating a spatial displacement of the reference image region from the current image region;

interpolating, via an interpolation filter, the predicted samples of the current image region by spatial interpolation of samples of the reference image region, at least in instances where the direction vector indicates a spatial displacement of a non-integer number of samples, in which the interpolation filter is configured to operate according to a set of filter parameters, each defining a spatial frequency response, of a set of filters providing interpolation at a spatial displacement resolution of 1/m sample, where m is an integer greater than one; and selecting the set of the filter parameters from two or more candidate sets of filter parameters for use in respect of at least the current image region based on only a single particular encoding parameter, wherein the single particular encoding parameter is one of a quantization parameter; an image size; an image region size; a position of the current image region in a hierarchy of image regions: a spatial frequency transform used by the image data encoding apparatus; and a magnitude of the direction vector;

encoding image data generated based upon the interpolated predicted samples; and transmitting an encoded data stream to an image decoding apparatus, the encoded data stream including the encoded image data in addition to a signaling of the single particular encoding parameter based on which the set of the filter parameters are selected, and the encoded data stream not including a parameter specific to the selection of the selected set of the filter parameters for use in respect of the at least the current image region.

7. An image data decoding method, comprising:

receiving encoded image data in an encoded data stream;

decoding the encoded image data to obtain image data, predicting samples of a current image region, of a plurality of regions of an image in a sequence of images of the image data, with respect to a reference image region of a reference image of the sequence of images, according to a direction vector indicating a spatial displacement of the reference image region from the current image region;

interpolating, via an interpolation filter, the predicted samples of the current image region by spatial interpolation of samples of the reference image region, at least in instances where the direction vector indicates a spatial displacement of a non-integer number of samples, in which the interpolation filter is configured to operate according to a set of filter parameters, each defining a spatial frequency response, of a set of filters providing interpolation at a spatial displacement resolution of 1/m sample, where m is an integer greater than one; and selecting the set of the filter parameters from two or more candidate sets of filter parameters for use in respect of at least the current image region based on only a single particular encoding parameter other than a parameter specific to the set of the filter parameters for use in respect of the at least the current image region, wherein the single particular encoding parameter is one of a quantization parameter; an image size; an image region size; a position of the current image region in a hierarchy of image regions; a spatial frequency transform used by the image data decoding apparatus; and a magnitude of the direction vector, wherein the encoded data stream includes the encoded image data in addition to a signaling of the single particular encoding parameter based on which the set of the filter parameters are selected, and the encoded data stream does not include the parameter specific to the selection of the selected set of the filter parameters for use in respect of the at least the current image region.

8. A machine-readable non-transitory storage medium configured to store code components which when executed on a computer cause the method according to claim 7 to be performed.

9. The apparatus according to claim 1, wherein the single particular encoding parameter is one of the quantization parameter; the position of the current image region in the hierarchy of image regions; the spatial frequency transform used by the image data encoding apparatus; and the magnitude of the direction vector.

10. The apparatus according to claim 3, wherein the single particular encoding parameter is one of the quantization parameter; the position of the current image region in the hierarchy of image regions; the spatial frequency transform used by the image data decoding apparatus; and the magnitude of the direction vector.

* * * * *